(No Model.)
J. ATKINSON.
SAFETY BRIDLE AND RELIEVABLE BIT.
No. 468,299. Patented Feb. 2, 1892.
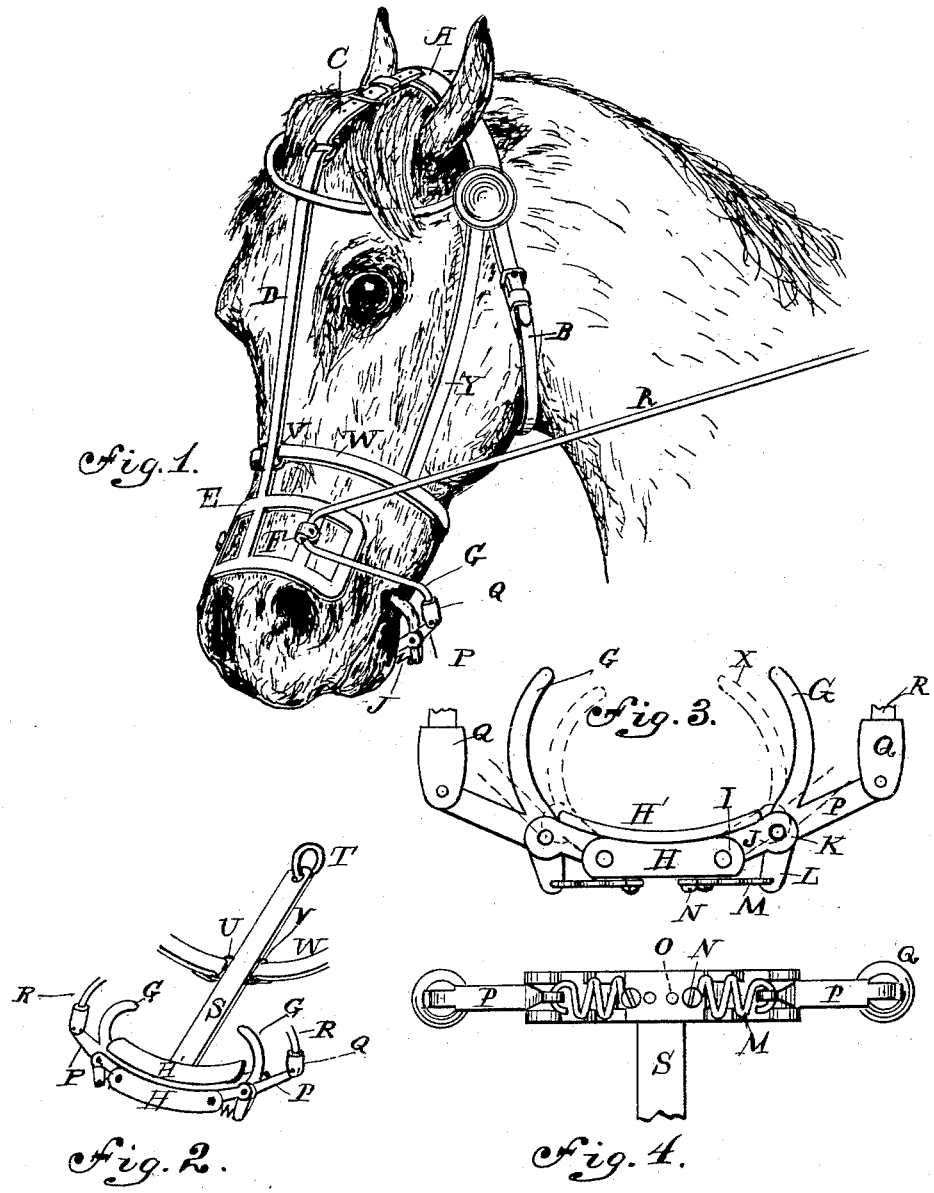
WITNESSES:
A. Martin
P. A. Jones.
INVENTOR
J. Atkinson
BY
ATTORNEY.

UNITED STATES PATENT OFFICE.

JOHN ATKINSON, OF NEW YORK, N. Y., ASSIGNOR OF ONE-THIRD TO CHARLES J. MORTIMER, OF SAME PLACE.

SAFETY-BRIDLE AND RELIEVABLE BIT.

SPECIFICATION forming part of Letters Patent No. 468,299, dated February 2, 1892.

Application filed September 9, 1890. Renewed December 5, 1891. Serial No. 414,124. (No model.)

*To all whom it may concern:*

Be it known that I, JOHN ATKINSON, a citizen of the United States, and a resident of New York, in the county of New York and State of New York, have invented certain new and useful Improvements in Safety-Bridles and Relievable Bits, of which the following is a specification.

The object of this invention is to provide a safety-bridle and relievable bit for bridles so constructed and arranged that the horse cannot by any possibility seize the bit in his mouth; and it further provides a means for closing the nostrils should the animal become fractious, thereby enabling the driver to maintain perfect control at all times.

Figure 1 is a perspective view of the improved bridle in position on a horse. Fig. 2 is a perspective view of that portion behind the horse's jaw; Fig. 3, front view of the bit and its operating parts; Fig. 4, view of the under side of the same.

The invention consists of the ordinary top or crown strap with the throat-strap. Centrally to the top strap is attached a spring-metal strip which extends down the frontal bone of the animal's head, terminating in a shield, which is curved around over or above the nostrils. This shield has on each side a roller and eye to receive the rein or line which passes through and attaches to the outer end of a lever or arm, which is hinged to a cross-plate behind the jaw of the horse. This arm has projecting therefrom upwardly and forwardly a curved finger designed to enter the mouth of the horse, whenever the driver so desires it, by drawing on the rein, and when the rein is drawn through the eye of the front shield these curved fingers enter the mouth from opposite sides and clamp the jaw of the horse, and at the same time close his nostrils, thereby enabling the driver to control the horse without any difficulty, as will now be set forth in detail.

In the drawings, A represents the crown-strap, made in the ordinary manner, with the throat-strap B attached thereto. To the top of this crown-strap is attached a forwardly-projecting strap C, containing a buckle, so as to provide a loop by means of which it may be attached to the spring-metal strip D, which extends down the front of the face. The lowest end of the metal strip D is provided with a shield E, composed of the upper and lower horizontally-disposed strips and five vertical strips, constituting a sort of frame, which is located on the front of the face directly above the nostrils. This frame or shield, being made of spring-steel or other suitable material, is curved to conform to the shape of the nose, will rest easily, and cause no chafing or irritation of the animal. On each of the intermediate vertical strips, except the center one, I place an eye F or loop, through which the rein or line is placed.

The "bit," so-called, is a departure from the conventional style of bits, composed, as it is, of two fingers or prongs G, curved toward each other and adapted to be placed in the mouth of the animal behind the teeth. These prongs are held in position by means of a slightly-curved bar H, provided at each end with ears I, to which is hinged a short link J, the outer end of which, also, has ears K to receive the hinged prongs G. Projecting from the lower end of the prong or below its pivotal or hinged point is an arm L, to which is secured an inwardly-projecting spring M, the inner end of which is secured to the under side of the bar H by means of a screw N or otherwise. A series of holes O may be placed in this bar, so as to provide for giving the prong-bit more or less tension or to adjust it to the mouth of the horse, as may be desired. Extending outwardly at an angle from the pivotal point of the point of the prong and homogeneous with the latter is an arm P, having a hinged socket Q on its outer end, to which the rein or line R is secured.

On the upper side of the bar H and links J J is a leather pad, so as to protect the jaw from the action of the links and prongs in their movements. Projecting from the rear side of the bar H centrally is a metal strip S, the upper end of which has a ring or loop T, through which the throat-strap B passes. Midway between the ends of this strip it is provided with a loop V on each side. The front strip D is similarly provided with loops V, to which loops are attached the straps W, which encircle the head above the jaws. At each side is a strap Y, attached to its corresponding strap W, the upper end of which is attached to the crown-strap (and this strap may or may not be provided with an adjusting-buckle) at the rosette. By these means the pronged bits are held in position and ready at all times to be acted upon. The lines after being passed through the eye F and attached to the respective arms P on the opposite sides produce a double effect on the horse. The first action on drawing back the lines severely is to move inwardly the prongs G, because the shield is made of material heavy enough to resist the action of the tension on the lines until the prongs clasp the under jaw tightly; but should the horse be unruly a still greater tension on the lines will cause the shield to move inwardly and close the nostrils, thus speedily bringing the animal into subjection.

For ordinary driving neither the pronged bits nor the shield act and only a slight pressure needs to be exerted on the nostrils of the horse, which is done by slightly pulling on the lines, thereby causing the shield to press lightly against the nostrils. The animal is therefore driven by this means alone, and the clamping of the jaw and the closing of the nostrils takes place only where the horse is fractious or unruly.

The bridle thus constructed is easily adjusted to fit any animal, is quickly applied, and can be as easily attached to a refractory horse as though the bit was not present, and it is impossible for the horse to grasp the prongs between his teeth because they are always beyond the reach of the teeth.

The peculiar feature of my invention consists in providing a bridle wherein the bit itself is kept out of the mouth of the horse at all times, except where it is absolutely necessary to control the animal in case he is fractious. In that event the prongs or bits are forced into the mouth on opposite sides, and when the animal is eased and the reins released his mouth is again relieved of the bit by the action of the springs on the under side of the bar.

What I claim as new is—

1. A bridle having a spring shield or frame adapted to stride the nose, provided with eyes or loops for the rein, in combination with a bit composed of hinged, inwardly-curved, and movable prongs for the mouth of the horse, and means for compressing the shield for closing the nostrils and operating the prongs for clamping the jaw, substantially as herein set forth.

2. The bridle composed of the spring-strip extending down the face of the horse, adjustable at its upper end, and provided at its lower end with a shield or laterally-projecting wings curved around the face of the animal over the nostrils, in combination with the metallic bit-frame under the jaws, substantially as herein set forth.

3. A bridle having on the under side of the jaws a bar provided at each end with links hinged thereto and at the other ends of said links the hinged, upwardly-extending, and inwardly-curved prongs for the mouth of the animal, with the downwardly-projecting arms and adjustable springs connected therewith on the under side of the bar and with the outwardly-extending arm for attaching the rein thereto, substantially as herein set forth.

4. A bridle having on the under side of the jaw a vertically-disposed metal strip the upper end of which is in engagement with the throat-strap and the lower end being provided with a cross-bar, with links and upwardly-projecting inwardly-curved prongs hinged thereto, the downwardly-projecting arms and adjusting-springs, and the outwardly-extending arms for the reins, with the flexible shield on the nose of the animal, having the eyes or loops thereon, and the rein for controlling the movements of the shield and the prong-bit, substantially as herein set forth.

5. In a bridle, the within-described bit, constructed substantially as set forth, having the two prongs or fingers G, hinged or pivoted thereto, and provided with the arm P, and the socket Q, hinged thereto and adapted to be moved by the reins, whereby said fingers or prongs can be clamped upon the jaw.

Signed at New York, in the county of New York and State of New York, this 5th day of September, A. D. 1890.

JOHN ATKINSON.

Witnesses:
CHAS. L. MARTIN,
J. S. ZERBE.